Patented Apr. 29, 1930

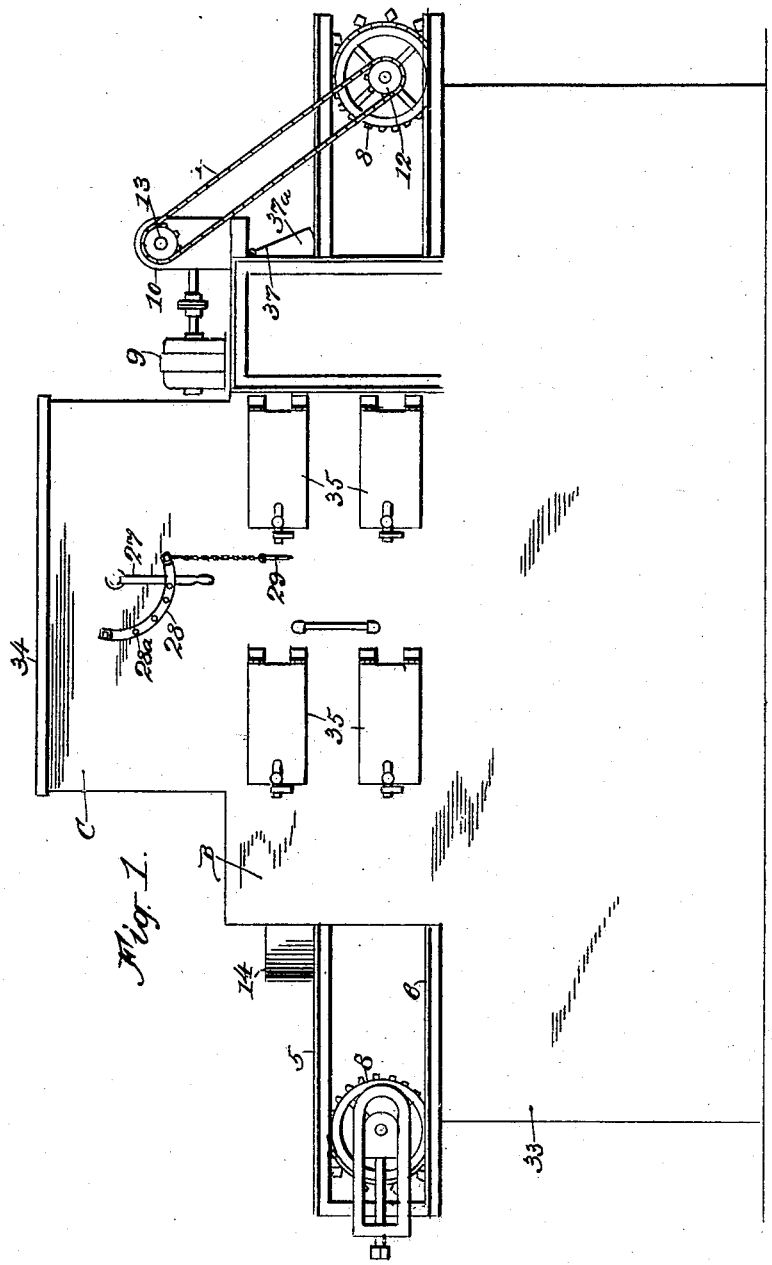

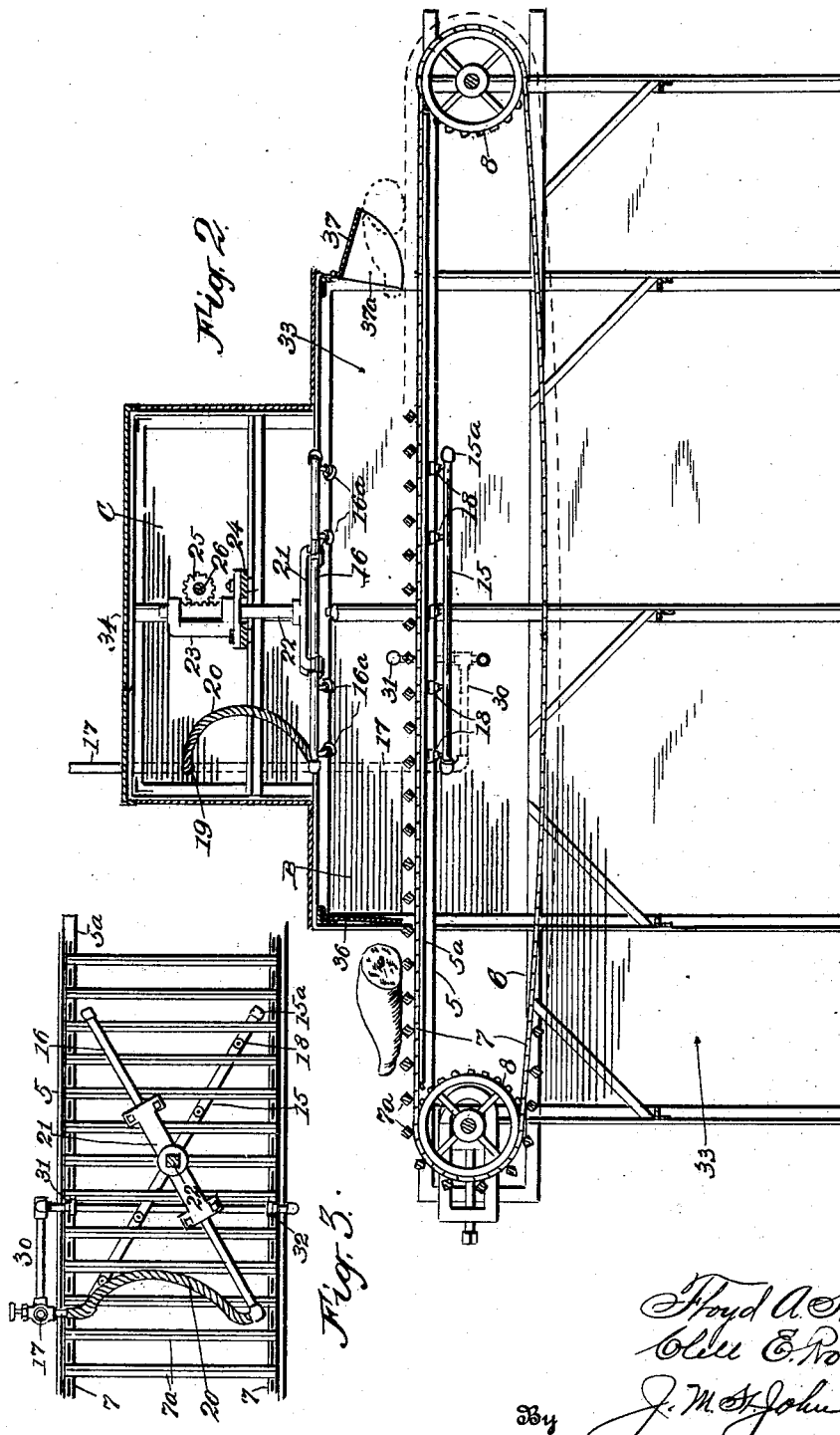

1,756,517

UNITED STATES PATENT OFFICE

FLOYD A. KNIGHT AND CLELL E. ROWE, OF CEDAR RAPIDS, IOWA

MEAT-WASHING MACHINE

Application filed April 21, 1928. Serial No. 271,786.

This invention relates to the washing of meats, and more particularly the cleansing of hams, bacon and the like, preparatory to smoking.

In packing-house practice all meats when taken from the pickle preliminary to smoking must be thoroughly washed in water to rid them of objectionable matter of every sort. This, as ordinarily performed, is a hand process, and by the use of scrubbing brushes on a table or conveyor. The work is laborious, necessarily slow, and the results are less satisfactory than those attained by the mechanical washing hereinafter described.

The invention is fully disclosed in the description and claims following, reference being had to the accompanying drawing, in which:—

Figure 1 is a side elevation of a washer embodying the invention. Fig. 2 is a longitudinal section of the machine in a vertical plane practically central to the machine. Fig. 3 is a fragmentary plan view showing the sprayer heads, service pipes therefor and a part of the conveyor.

The uprights of a typical steel frame are tied by longitudinal bars 5 and 6, the former being at a convenient working level. The upper bar has inwardly projecting flanges 5ª to support the side-chains 7 of a conveyor running on sprockets 8 mounted near the ends of the frame. The conveyor has carrying cross bars 7ª of square steel attached to the side chains so as to present angles up and down, and thus facilitate the flow of water from the spray nozzles to the meat carried by said cross-bars, as will more clearly appear presently. The conveyor is driven by an electric motor 9 mounted on a higher deck of the main frame, and connecting by a worm-gear speed reducer 10 mounted on the same deck. The reduced speed is transmitted to the conveyor by a chain 11 and sprockets 12 and 13. The meat to be cleansed is deposited on the conveyor near the opposite end, and is thence carried slowly past the sprayers, to be described presently. A curved wing 14 serves for turning the meat to a proper course on the conveyor when delivered thereon from a cross-conveyor not shown.

Within that portion of the frame A which may be designated as the second story or deck B, and traversed by the conveyor, is disposed a pair of sprayer-heads 15 and 16, respectively. The former is set fixedly a few inches below the carrying half of the conveyor, and connects at one end directly with the supply-pipe 17, which is supposed to carry water at a high pressure, 200 to 400 pounds, more or less. The sprayer head is formed of pipe, closed at 15ª, and provided with a series of upstanding jets 18. The sprayer is disposed diagonally under the conveyor, as shown in Fig. 3, so that as the meat travels forwardly no part of its under side can be missed by one or more of the jets. As the meat lies on the thin angles of the conveyor cross-bars the sprayed water can be driven to the entire under surface of the meat, which is thus thoroughly and completely cleansed.

Over the conveyor is mounted the spray-head 16, disposed at an opposite angle to the lower spray-head, and for the same reason. This spray-head has its jet nozzles disposed at varying angles converging toward the center, as shown in Fig. 2. By this means the jets near the ends of the head are projected diagonally downward, and being oppositely inclined serve to powerfully spray the ends of the meat, as well as the top side, as the meat is carried forward. In order to secure the highest efficiency the sprayers should be placed near the surface acted upon, and for this reason the upper sprayer is made vertically adjustable, since the vertical thickness of the meats will vary, from thin bacon to thick hams. The sprayer head is therefore connected with the service pipe at 19 by a flexible hose 20, the opposite end of the head being capped. To the middle portion of the head is connected a yoke 21, and from this rises a guide-bar 22 slidable in a guide 23 mounted on cross-bars 24 in the superstructure C. A part of the guide-bar is formed as a rack to engage a pinion 25 on a cross-shaft 26. A lever 27 connects with this shaft, and is held in any desired position by a sector 28.

The sector is herein shown as pierced with holes 28ª to receive a supporting pin 29.

From the main service pipe a branch 3 supplies at one side of the conveyor a nozzle 31 disposed horizontally, and crossing under the supporting part of the conveyor, terminates in a nozzle 32 fronting in the opposite direction. These nozzles project their spray on the opposite sides of the meat as it passes between them. The meat is thus sprayed on all of its sides and completely cleansed.

The frame of the machine is practically enclosed by a housing 33, except at the ends which are necessarily open for the conveyor and its load. This allows for a comfortable operation of the machine, protected from the dash of a violent spray. The iron and steel parts of the machine are suitably protected against rust, as by galvanizing, or other rust-proofing means.

The work of the machine is not only thorough, but very rapid, as compared with hand work, a single machine doing the work of many men. The superiority of its cleansing, removing as it does all slime and other deleterious matter, is made evident by the final smoked product. Under the less thorough hand washing, hams and bacon when smoked take on dull colors, the fats a dirty yellow and the other parts a brownish red. Under the same smoking conditions the machine-cleansed hams and bacon leave the fat a clear white and the skin a bright mahogany color, materially increasing their attractiveness and salability.

A removable cover 34 for the top section C gives access to the interior, and doors 35 at the side enable the operator to see the workings inside, and regulate the movable spray-head as conditions may demand.

At the end where the meat enters the housing, a flap 36, hinged at the top, is adapted to swing outwardly, as shown to prevent splash from the spray within. As the meat moves forwardly the flap is automatically swung and lifted inwardly by the moving meat. The flap for the same purpose at the exit end of the housing, 37, is made to swing outwardly as the meat passes under it, and to prevent side-splash is provided with side-wings 37ª.

Having thus described our invention, we claim:

1. In a meat washer the combination of a conveyor having upwardly and downwardly sharply angled carrying members with open spaces between and spray appartus disposed above, below and at the sides of said carrying members.

2. In a meat-washer, the combination of a conveyor, spray members disposed at the sides of the conveyor to project spray inwardly, and spray apparatus disposed above and below the transporting part of the conveyor, such spray apparatus comprising series of spray nozzles arranged diagonally across the conveyor.

3. In a meat-washer, the combination with a conveyor, a spraying head extending diagonally across the conveyor, and provided with a series of spray nozzles directed toward said conveyor.

4. In a meat-washer, the combination of a conveyor, spray apparatus disposed above, below and at the sides of the carrying portion of the conveyor, and an enclosing housing for the spray apparatus, and closable openings in said housing.

5. In an organized meat-washing machine, a conveyor, a supporting frame therefor, a motor and speed-reducer carried by said frame, spray apparatus disposed above, below and at the sides of the carrying part of the conveyor, and an enclosing housing for said spray apparatus.

6. In an organized meat-washing machine, a conveyor, a supporting frame therefor, a housing for the conveyor open at the ends to admit and discharge the meat, spray apparatus inside the housing, and an inwardly springing flap to prevent splash when in its normal, depending position.

7. In a meat-washing machine, a conveyor, a supporting frame therefor, a housing for the conveyor open at the receiving and exit ends, spray apparatus inside the housing, and an outwardly swinging flap at the exit end, provided with side-wings to prevent side-splash when swung outwardly.

In testimony whereof we affix our signatures.

FLOYD A. KNIGHT.
CLELL E. ROWE.